This invention relates to the cooling of brakes on large vehicles and particularly to a system utilizing oil or hydraulic fluid in the return lines of various hydraulic control systems employed on the vehicle as a brake coolant.

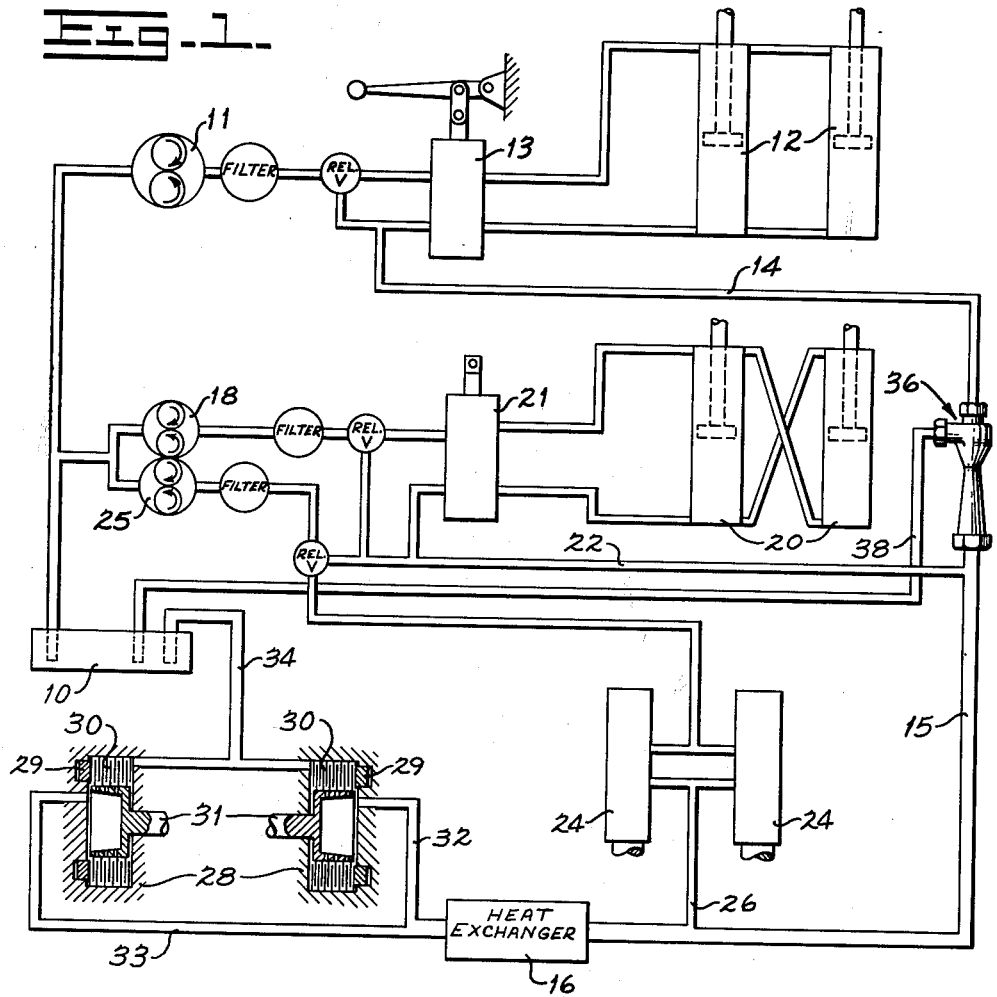
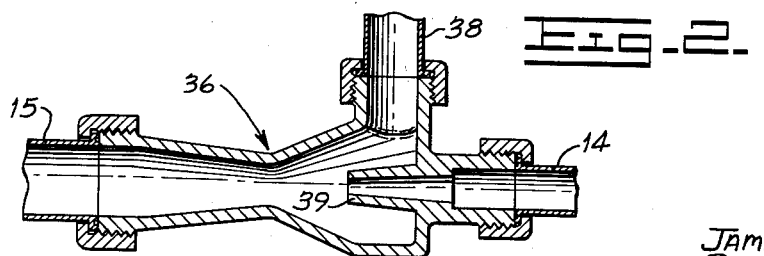
INVENTORS
JAMES W. THOMPSON
BY ROBERT E. GERBER
ATTORNEYS 3,101,815
VEHICLE BRAKE COOLING SYSTEM
James W. Thompson, Pekin, and Robert E. Gerber, Peoria, Ill., assignors to Caterpillar Tractor Co., Peoria, Ill., a corporation of California
Filed June 29, 1961, Ser. No. 120,681
2 Claims. (Cl. 188—264)

Due to the size and relatively high speed of operation of present day trucks and tractors, the shoe-type brake used on smaller equipment has proven inadequate and multiple disc-type brakes are employed to provide the necessary braking capacity. Even with the new type of brake the heavy braking loads imposed generate heat which must be dissipated to obtain acceptable brake life. It has, therefore, become common practice to circulate a coolant through the brakes and in contact with the friction faces of the discs thereof. In heavy machines such as large trucks and tractors, a large volume of flow of coolant is required, calling for at least one, and in some cases two, hydraulic pumps for forcing oil through the brakes. This is undesirable in that the pumps are costly, space consuming, and contribute to the overall weight of the vehicle.

Most large vehicles of the kind referred to have several hydraulically actuated components and it is the object of the present invention to utilize the oil or hydraulic fluid in the return lines of these components so that the unused energy of pumps necessary for their operation serves to circulate the oil in the return lines through the brakes as a coolant therefor.

A further object of the invention is to provide means to supplement the volume of oil in said return lines by ejecting or siphoning oil from a main reservoir and passing it through the brakes together with the return oil.

Further and more specific objects and advantages of this invention and the manner in which it is carried into practice are made apparent in the following specification in which reference is made to the accompanying drawing.

In the drawing:

FIG. 1 is a schematic view of various hydraulic control systems of a large truck or wheel type tractor which is used as an example of a machine in which the invention may be employed and showing the invention included in said circuits; and FIG. 2 is an enlarged sectional view of an ejector or siphon shown in FIG. 1.

The drawing shows three typical hydraulic circuits having a common oil supply or reservoir 10. The first or uppermost circuit in FIG. 1 comprises a pump 11 for directing oil under pressure through a conventional filter and relief valve and to a pair of hydraulic jacks 12 employed for the raising and lowering the body of a dump truck. A conventional control valve 13 serves to direct oil selectively to opposite ends of the jacks which are of the double acting type. Oil from the relief valve, return oil from the jacks when they are being operated, or all of the oil from the pump 11 which passes through the valve and returns while the jacks are not being operated, flows through a return line 14, thence to a common return line 15 by means of which it is directed to a heat exchanger shown at 16 which is any one of many conventional and commercially available types.

A pump 18 also delivers oil from the reservoir 10 through a filter and relief valve to a pair of steering jacks 20, a valve 21 being employed to control the direction of steering. The relief fluid and all return fluid from this system is also directed through a return line 22 to the common return line 15.

A third hydraulic system is shown as including a pair of suspension struts of the hydraulic pneumatic type schematically illustrated at 24 and requiring a constant source of oil under pressure in their operation. These struts are supplied with oil from a pump 25 also drawing upon the reservoir 10 and having a relief valve which exhausts into the same line 22 used by the relief valve of the steering system and a discharge line 26 both communicating with the common return line 15. Thus all of the oil returning from the several systems described which is usually cooled and returned to the reservoir 10 without performing further useful service, is available for cooling the vehicle brakes herein shown as two in number at 28. These brakes, also of conventional type, employ annular pistons 29 which, when subjected to fluid pressure through means not shown, bear upon stacks of brake discs indicated at 30 to urge them into frictional contact for retarding the speed of shafts or axles controlled by them shown at 31. All of the return oil from the several systems shown is directed through lines 32 and 33 through the brake disc compartments and then discharged through a line 34 to the reservoir 10. In this manner a very large volume of oil is employed for the purpose of cooling the brakes without the use of pumps, filters and relief valves other than those already existing in the truck.

An even greater volume of oil for cooling the brakes may be made available and may be required in some instances where vehicles have a greater number of brakes to be cooled. This is accomplished by the use of a siphon or ejector generally indicated at 36 in FIG. 1 and shown in greater detail in FIG. 2. This ejector is interposed between the return line 14 of the dumping jacks 12 and the common return line 15 and has an intake line 38 communicating with the reservoir 10. The operation of such siphons is well known and briefly comprises the creation of a high velocity flow through a jet 39 which induces suction in the area surrounding the jet and in the intake line 38 so that return oil being employed for cooling the brakes is supplemented by oil withdrawn from the reservoir 10. The ejector 36 may be employed at various positions in the system but is shown as receiving oil only from the hydraulic circuit of the large body tilting jacks 12. This is a preferred location because some back pressure is created in the line 14 by use of the siphon and, since the body dumping jacks 12 are employed only when the other circuits are not in use, a high velocity flow in the line 14 is available at the times when it is most needed.

We claim:

1. A system for cooling the brakes of a vehicle which has a plurality of hydraulically controlled components including a reservoir for hydraulic fluid and individual pumps, fluid motors and controls for said components, a common return line for more than one of said components, means directing fluid from said return line to said brakes, means directing fluid from said brakes to said reservoir, and an ejector operating on pressure in the return line to draw fluid from the reservoir to supplement the return fluid used for cooling the brakes.

2. A system for cooling the brakes of a vehicle which has an hydraulically controlled component including a reservoir, a fluid motor and a pump for directing fluid from the reservoir to the motor, a return line in the circuit of said component for directing return fluid under pressure of said pump to said brakes, a line between the reservoir and the brakes, and means to induce flow from the reservoir to the brakes through said last named line, to augment the cooling effect of said return fluid.

(References on following page)

References Cited in the file of this patent

UNITED STATES PATENTS

| | | |
|---|---|---|
| 2,098,490 | Fitzpatrick et al. | Nov. 9, 1937 |
| 2,775,328 | Yokel | Dec. 27, 1956 |
| 2,832,428 | Kelley et al. | Apr. 29, 1958 |
| 2,924,308 | Kelley | Feb. 9, 1960 |
| 2,944,618 | Schjolin | July 12, 1960 |
| 2,946,416 | Snoy | July 26, 1960 |
| 2,968,368 | Schjolin et al. | Jan. 17, 1961 |
| 2,968,379 | Kelley | Jan. 17, 1961 |